United States Patent
Saito (10) Patent No.: US 10,221,909 B2
(45) Date of Patent: Mar. 5, 2019

(54) DAMPER DEVICE (71) Applicant: PIOLAX, INC., Yokohama-shi (JP)

(72) Inventor: Jun Saito, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 33 days.

(21) Appl. No.: 15/113,777

(22) PCT Filed: Oct. 8, 2014

(86) PCT No.: PCT/JP2014/076892
§ 371 (c)(1),
(2) Date: Jul. 22, 2016

(87) PCT Pub. No.: WO2015/114885
PCT Pub. Date: Aug. 6, 2015

(65) Prior Publication Data
US 2017/0009837 A1    Jan. 12, 2017

(30) Foreign Application Priority Data
Jan. 31, 2014    (JP) .................. 2014-017117

(51) Int. Cl.
*F16F 9/32*    (2006.01)
*F16F 9/02*    (2006.01)
(Continued)

(52) U.S. Cl.
CPC .............. *F16F 9/0227* (2013.01); *E05F 5/10* (2013.01); *F16F 9/0218* (2013.01);
(Continued)

(58) Field of Classification Search
CPC ...... F16F 9/0218; F16F 9/0227; F16F 9/0281; F16F 9/02; F16F 9/3214; F16F 9/516; F16F 9/368; F16F 2236/06; E05F 3/02
See application file for complete search history.

(56) References Cited

U.S. PATENT DOCUMENTS 5,471,708 A * 12/1995 Lynch .................. E05F 3/02
16/66
6,220,583 B1 * 4/2001 Ito ....................... F16F 9/0218
267/226
(Continued)

FOREIGN PATENT DOCUMENTS

DE    4236150 A1 *  4/1994  ............ F16F 9/0245
EP    2 799 736 A1    11/2014
(Continued)

OTHER PUBLICATIONS

English Translation of the International Preliminary Report on Patentability (PCT/IPEA/409) in PCT Application No. PCT/JP2014/076892 dated Jan. 8, 2016.
(Continued)

*Primary Examiner* — Bradley T King
*Assistant Examiner* — Stephen M Bowes
(74) *Attorney, Agent, or Firm* — McGinn I. P. Law, Group, PLLC.

(57) ABSTRACT

A damper device is configured so that a piston moves in a cylinder. A seal ring member is provided to the outer periphery of the piston to device the inside of the cylinder into a first chamber and a second chamber. A transmission member is connected to the piston and can transmit external force to the piston. A cutout section is formed with a predetermined circumferential width in a first stopper surface. A communication section has an opening in an annular outer peripheral section located closer to the second chamber than the cutout section. When the seal ring member is pressed toward the first stopper surface, the seal ring member is deformed so as to partially enter the cutout section.

20 Claims, 9 Drawing Sheets (51) Int. Cl.
  *F16J 1/00* (2006.01)
  *F16F 9/36* (2006.01)
  *F16F 9/516* (2006.01)
  *E05F 5/10* (2006.01)
  *E05F 3/02* (2006.01)

(52) U.S. Cl.
  CPC .......... *F16F 9/3214* (2013.01); *F16F 9/3228* (2013.01); *F16F 9/368* (2013.01); *F16F 9/5165* (2013.01); *F16J 1/008* (2013.01); *E05F 3/02* (2013.01); *E05Y 2900/538* (2013.01); *F16F 2222/126* (2013.01)

(56) References Cited

U.S. PATENT DOCUMENTS

| | | |
|---|---|---|
| 2001/0023800 A1 | 9/2001 | Ookawara |
| 2011/0127129 A1 | 6/2011 | Okabayashi |
| 2012/0118689 A1 | 5/2012 | Ogawa |

FOREIGN PATENT DOCUMENTS

| | | | |
|---|---|---|---|
| GB | 2346192 A * | 8/2000 | ............ F16F 9/0218 |
| JP | H 05-67840 U | 9/1993 | |
| JP | H 08-105483 A | 4/1996 | |
| JP | 2001-263399 A | 9/2001 | |
| JP | 2010-001920 A | 1/2010 | |
| JP | 2010-265990 A | 11/2010 | |
| JP | 2013-133893 A | 7/2013 | |

OTHER PUBLICATIONS

English Translation of the International Search Report (PCT/ISA/210) in PCT Application No. PCT/JP2014/076892 dated Jun. 8, 2015.

International Search Report (ISR) (PCT Form PCT/ISA/210), in PCT/JP2014/076892, dated Nov. 18, 2014.

PCT/ISA/237 in PCT/JP2014/76892, dated Nov. 18, 2014.

* cited by examiner

DAMPER DEVICE

TECHNICAL FIELD

The present invention relates to a damper device provided with a seal ring member disposed on the outer circumference of a piston disposed inside a cylinder.

BACKGROUND ART

A damper device is provided so that a lid member of a glove compartment of a vehicle can be opened slowly. While operating to slowly open by the damping force, the damper device operates to, when closing the lid member, easily close the lid member without much resistance.

For example, PTL1 discloses an air damper that is mounted on an automobile glove compartment, and in order to prevent an O-ring from running idle, includes two O-rings. The air damper includes a piston that moves inside the cylinder, and a first O-ring and a second O-ring that are disposed on the outer circumference of the piston. The first O-ring is loosely fitted to the piston to be movable in the axial direction. In the technique of PTL1, the first O-ring runs idle, which is a state where the damping force does not act, until an opening provided to the piston is closed. The second O-ring immovable in the axial direction is provided in order to compensate for the damping force during the time when the first O-ring runs idle.

CITATION LIST

Patent Document

PTL1
JP-H08-105483-A

SUMMARY OF THE INVENTION

Problem that the Invention is to Solve

In an air damper, when an O-ring is brought into the state of being sealed at all times, large resistance is produced both when the O-ring moves forward and when the O-ring moves backward. In the air damper in PTL1, in order to change the damping force that is generated in accordance with forward and backward movement of the O-ring, the first O-ring is moved relatively to the piston when opening and closing operations of the lid member is switched. However, because the first O-ring runs idle, which is a state while the damping force is not generated due to the relative movement being not completed, the second O-ring immovable in the axial direction is required in order to compensate for the damping force during this state, which increases the number of components and causes the cost also increase.

The present invention is made in view of the above problem, and an object of the present invention is to provide a damper device capable of suppressing the number of components, and effectively gaining a damping force.

Means for Solving the Problem

To solve the above-described problem described above, an aspect of the present invention provides
a damper device including:
a cylinder including a bottom portion and an opening portion;
a piston that is movable forward and backward in the cylinder;
a seal ring member that is disposed on an outer circumference of the piston to abut on an inner circumference of the cylinder to thereby divide an inside of the cylinder into a first chamber and a second chamber; and
a transmission member that is connected to the piston, and capable of transmitting an external force to the piston,
wherein the piston includes
an annular outer circumferential portion that abuts on an inner circumference of the seal ring member,
a first stopper surface that protrudes in a radial direction from a side of the annular outer circumferential portion closer to the first chamber to thereby restrict movement of the seal ring member in an axial direction,
a second stopper surface that protrudes in the radial direction from another side of the annular outer circumferential portion closer to the second chamber to thereby restrict movement of the seal ring member in the axial direction,
a cutout portion that is formed on the first stopper surface and has a predetermined width in a circumferential direction, and
a communicating portion that is formed on the piston, and formed to communicate between the first chamber and the second chamber,
wherein the communicating portion includes an opening on the annular outer circumferential portion at a position from the cutout portion closer to the second chamber, and
wherein the seal ring member is pressed toward one of the first stopper surface and the second stopper surface in accordance with a forward and backward movement of the piston, and when the seal ring member is pressed toward the first stopper surface, the seal ring member is deformed to partially get in the cutout portion.

Another aspect of the present invention provides
a damper device including:
a cylinder including a bottom portion and an opening portion;
a piston that is movable forward and backward in the cylinder by an external force transmitted by a transmission member; and
a seal ring member that is disposed on an outer circumference of the piston to abut on an inner circumference of the cylinder to thereby divide an inside of the cylinder into a first chamber and a second chamber,
wherein the piston includes
an annular outer circumferential portion that abuts on an inner circumference of the seal ring member,
a first stopper surface that protrudes in a radial direction from a side of the annular outer circumferential portion closer to the first chamber to thereby restrict movement of the seal ring member in an axial direction,
a second stopper surface that protrudes in the radial direction from another side of the annular outer circumferential portion closer to the second chamber to thereby restrict movement of the seal ring member in the axial direction,
a cutout portion that is formed on the first stopper surface, and
a communicating portion that is formed on the piston, and formed to communicate between the first chamber and the second chamber, and
wherein a portion of the seal ring member gets in and out the cutout portion in accordance with a forward and backward movement of the piston to thereby open or close the communicating portion.

Advantageous Effects of Invention

With the present invention, the damper device is capable of effectively gaining a damping force.

MODE FOR CARRYING OUT THE INVENTION

Figures 1A, 1B:
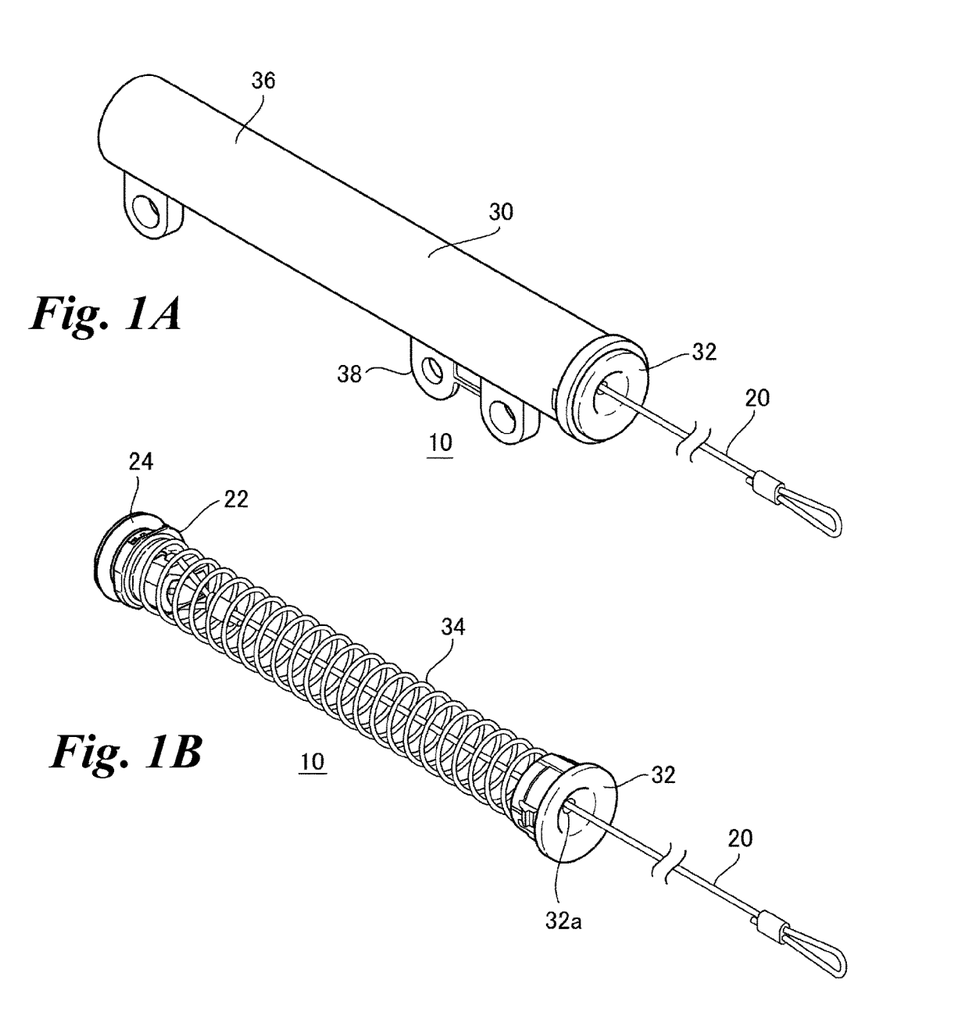
FIG. 1A is a perspective view of a damper device.
FIG. 1B is a perspective view of the damper device where a cylinder is removed to illustrate the internal structure.
Figure 2:
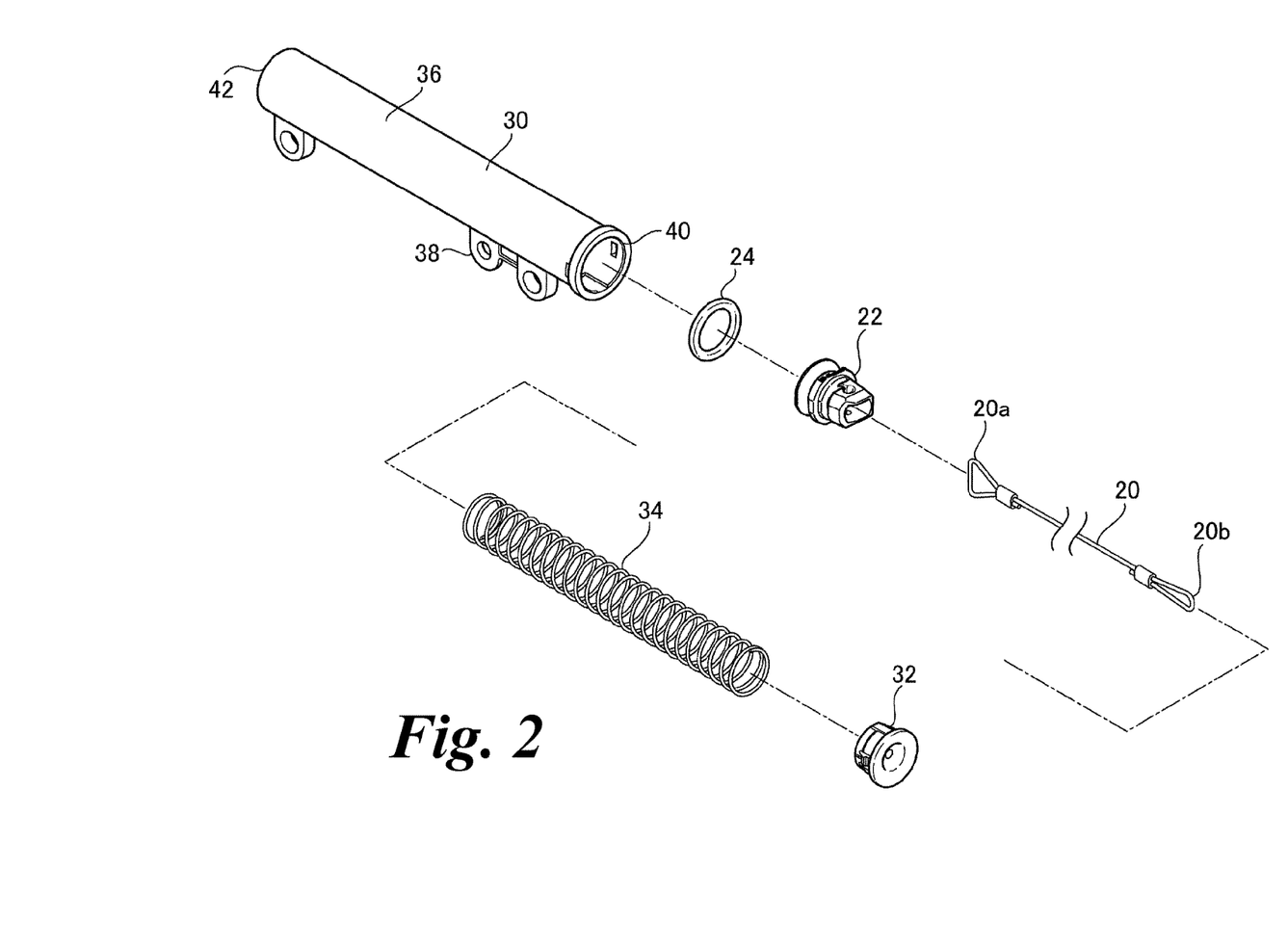
FIG. 2 is an erection diagram of the damper device.

FIG. 1A is a perspective view of a damper device 10, and FIG. 1B is a perspective view of the damper device 10 where a cylinder 30 is removed to illustrate the internal structure. FIG. 2 is an assembly diagram of the damper device 10. The damper device 10 is mounted on, for example, a glove compartment of a vehicle in order to impart a damping force to the opening and closing of an opening and closing member (lid member) of the glove compartment.

The damper device 10 includes a cylinder 30, a seal ring member 24, a piston 22, a transmission member 20, an urging member 34, and a lid member 32. The cylinder 30 has a circular cylindrical shape with a bottom. The cylinder 30 includes a cylinder portion 36, a mounting portion 38, an opening portion 40, and a bottom portion 42. The bottom portion 42 is disposed at one end of the cylindrical portion 36 while the opening portion 40 is disposed at the other end. The mounting portion 38 is disposed on the outer circumferential surface of the cylindrical portion 36. The damper device 10 is fixed to the glove compartment body via the mounting portion 38.

The seal ring member 24 defines an O-ring having a circular shape in cross section, and is made from a rubber material to have elasticity. The seal ring member 24 is disposed on the outer circumference of the piston 22. The piston 22 divides the inside of the cylinder 30 into a first chamber and a second chamber, and movable forward and backward in the cylinder 30. A chamber in the cylinder 30 that ranges from the seal ring member 24 to the opening portion 40 defines the first chamber, and a chamber in the cylinder 30 that ranges from the seal ring member 24 to the bottom portion 42 defines the second chamber. The seal ring member 24 is formed such that its outside diameter portion abuts on the inner circumferential surface of the cylinder 30, and capable of sealing the first chamber and the second chamber.

The transmission member 20 transmits an external force to the piston 22. A first connecting portion 20a at one end of the transmission member 20 is connected to the piston 22 while a second connecting portion 20a at the other end of the transmission member 20 is connected to the opening and closing member of the glove compartment.

The urging member 34 defines a coil spring, and one end thereof abuts on the piston 22 while the other end abuts on the lid member 32. The urging member 34 urges the piston 22 toward the bottom portion 42 of the cylinder 30. The lid member 32 is engaged with the cylinder 30 so that the opening portion 40 of the cylinder 30 is closed. The lid member 32 includes an aperture portion 32a into which the transmission member 20 is inserted.

The damper device 10 is configured such that the cylinder 30 is fixed to the glove compartment body while the transmission member 20 is connected to the opening and closing member of the glove compartment. The piston 22 moves forward and backward in the cylinder 30 in accordance with the opening and closing of the opening and closing member. When the piston 22 proceeds toward the opening portion 40, the first chamber in the cylinder 30 that is closer to the bottom portion 42 produces negative pressure that becomes a damping force. To be specific, when the opening and closing member is opened, the transmission member 20, the piston 22, and the seal ring member 24 are pulled toward the opening portion 40. Then, the negative pressure produced in the first chamber can reduce the speed of opening of the opening and closing member. A detailed description of the piston 22 of the damper device 10 will be provided.

Figure 3A:
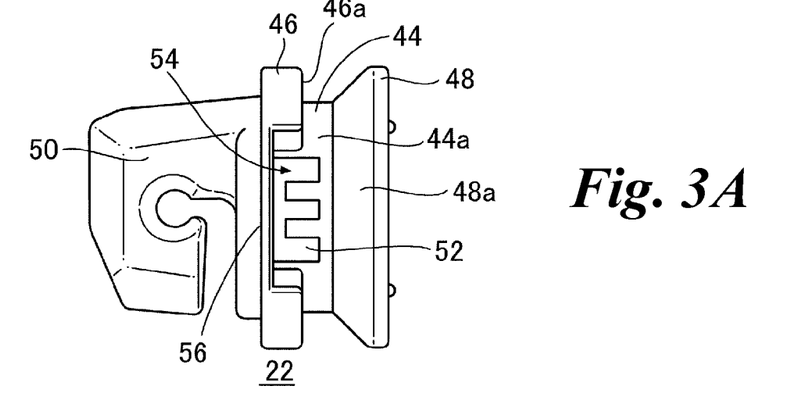
FIG. 3A is a side view of a piston when a connecting portion is viewed from the side.
Figure 3B:
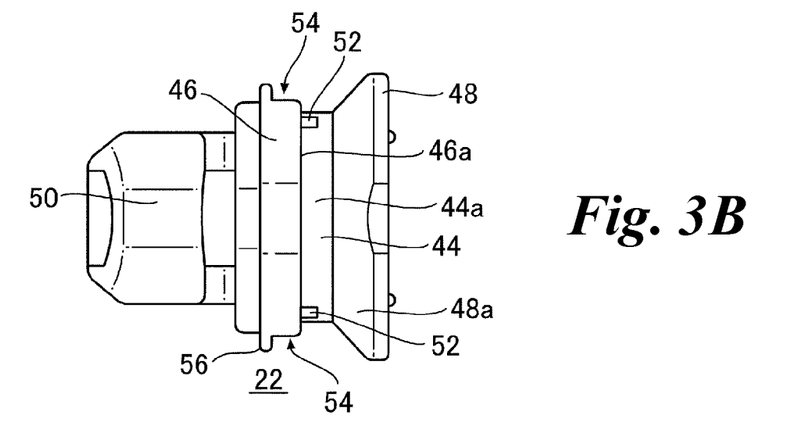
FIG. 3B is a side view of the piston when the connecting portion is viewed from the front.
Figure 3C:
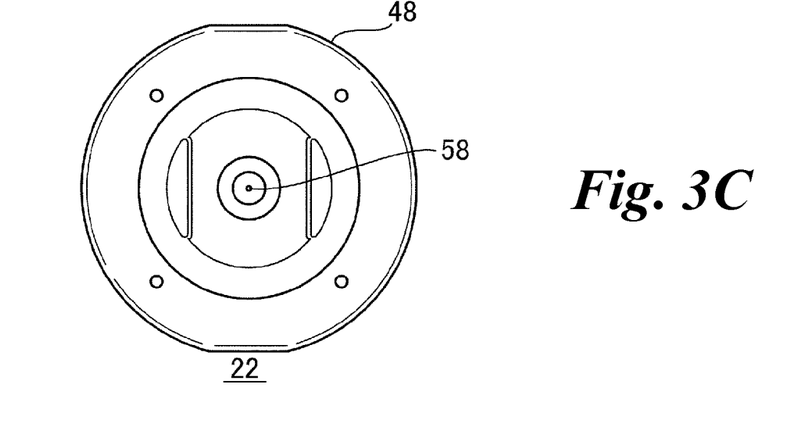
FIG. 3C is a rear view of the piston.
Figure 4A:
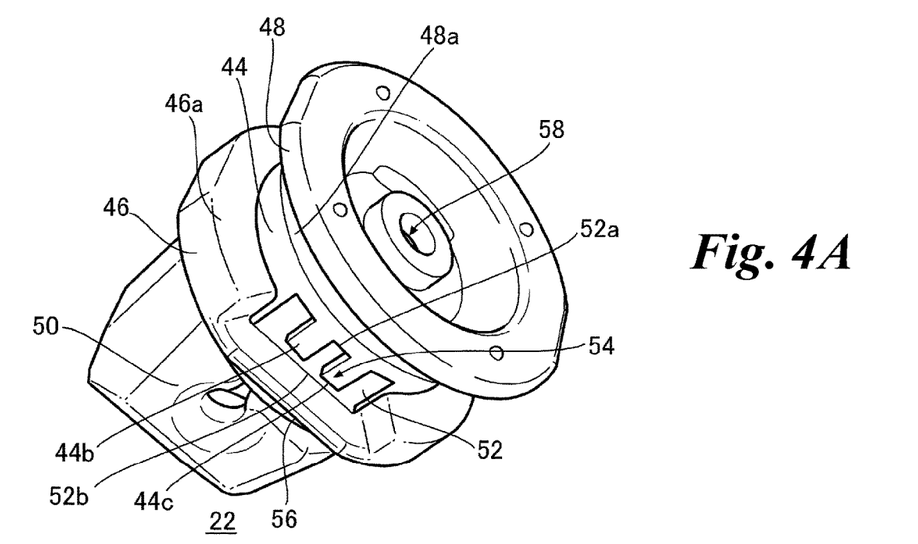
FIG. 4A is a perspective view of the piston viewed from the rear side.
Figure 4B:
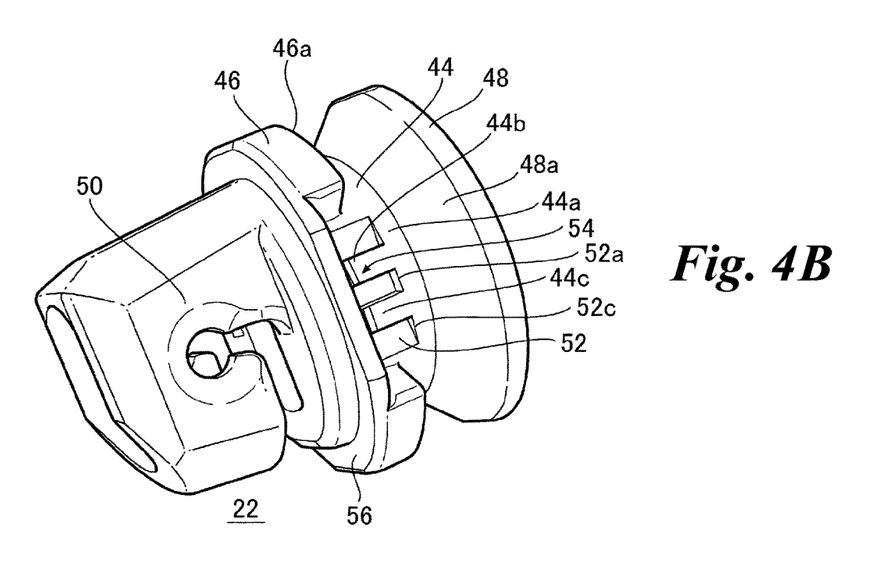
FIG. 4B is a perspective view of the piston viewed from the front side.

FIG. 3A is a side view of the piston 22 when a connecting portion 50 is viewed from the side, FIG. 3B is a side view of the piston 22 when the connecting portion 50 is viewed from the front, and FIG. 3C is a rear view of the piston 22. FIG. 3B is a view indicating FIG. 3A in the state of being rotated 90 degrees in the axial direction. FIG. 4A is a perspective view of the piston 22 viewed from the rear side, and FIG. 4B is a perspective view of the piston 22 viewed from the front side.

The piston 22 includes a small-diameter portion 44, a first large-diameter portion 46, a second large-diameter portion 48, a connecting portion 50, groove portions 52, cutout portions 54, a seat portion 56, and an orifice 58. The connecting portion 50 is disposed at the distal end of the piston 22, and has a hook shape so as to be connectable with the first connecting portion 20a of the transmission member 20. The connecting portion 50 protrudes from the seat portion 56. The seat portion 56 functions as a seating face on which one end of the urging member 34 abuts.

As shown in FIG. 3A, following the seat member 56, the first large-diameter portion 46, the small-diameter portion 44, and the second large-diameter portion 48 are arranged in order. The first large-diameter portion 46 and the second large-diameter portion 48 are larger in diameter than the small-diameter portion 44. The small-diameter portion 44 that is recessed is disposed between the first large-diameter portion 46 and the second large-diameter portion 48.

The seal ring member 24 is mounted on the small-diameter portion 44, and has its movement restricted by the first large-diameter portion 46 and the second large-diameter portion 48. An annular outer circumferential portion 44a is provided as the outer circumferential surface of the small-diameter portion 44, on which the inner circumference of the seal ring member 24 abuts when the seal ring member 24 is mounted on the annular outer circumferential portion 44a.

As shown in FIG. 4A, a surface of the first large-diameter portion 46 that is closer to the small-diameter portion 44, that is, the rear side surface, functions as a first stopper surface 46a. The first stopper surface 46a restricts the movement of the seal ring member 24 in the axial direction. The first stopper surface 46a protrudes in the radial direction on one end of the annular outer circumferential portion 44a in the axial direction. The first stopper surface 46a is orthogonal to the axial direction.

A surface of the second large-diameter portion 48 that is closer to the small-diameter portion 44, that is, the top side surface, functions as a second stopper surface 48a. The second stopper surface 48a restricts the movement of the seal ring member 24 in the axial direction. The second stopper surface 48a protrudes in the radial direction on the other end of the annular outer circumferential portion 44a in the axial direction. The second stopper surface 48a has a tapered shape so as to be radially expanded from the small-diameter portion 44 toward the rear side surface. The second stopper surface 48a is inclined with respect to the first stopper surface 46a.

The first stopper surface 46a of the first large-diameter portion 46 is provided with two cutout portions 54. The cutout portions 54 have a predetermined width in the circumferential direction, for example, they are set to have an angular width of 45 degrees to 70 degrees. The width in the circumferential direction of the cutouts 54 is set in accordance with the hardness of the seal ring member 24 or the diameter of the small-diameter portion 44. The cutout portions 54 are provided so as to cut out the first large-diameter portion 46 in the axial direction from the side of the small-diameter portion 44. By providing the cutout portions 54, a portion having the same diameter as the small-diameter portion 44 or being more recessed than the small-diameter portion 44 is provided so as to be connected to the small-diameter portion 44, and thus the annular outer circumferential portion 44a extends in the axial direction.

The groove portions 52 have a groove shape so as to be recessed more than the annular outer circumferential portion over the annular outer circumferential portion 44a from the portion where the cutout portions 54 are disposed. The groove portions 52 are disposed over the annular outer circumferential portion 44a at positions from the cutout portions 54 closer to the second chamber, and has at least an opening on the annular outer circumferential portion 44a. In each of the groove portion 52, a radial deformation suppressing portion 44b and a radial deformation pressing portion 44c are provided on the same plane as the annular outer circumferential portion 44a so as to extend in the axial direction. The radial deformation suppressing portion 44b and the radial deformation pressing portion 44c are provided in order to prevent the seal ring member 24 from falling into each groove portion 52 to close the groove portion 52 when the seal ring member 24 rides on the groove portion 52. The groove portions 52 function as a communicating portion. While the first chamber and the second chamber of the cylinder 30 are divided by the seal ring member 24, the communicating portion is formed to communicate between the first chamber and the second chamber of the cylinder 30.

As shown in FIGS. 3C and 4A, the piston 22 includes the orifice 58 which communicates between the first chamber and the second chamber. The orifice 58 is a very small air hole. The cross-sectional area of the orifice 58 is smaller than the cross-sectional area of a flow path in a state where a communication is made via the groove portion 52. The operation of the damper device 10 will be described in detail with reference to the following drawings.

Figure 5A:
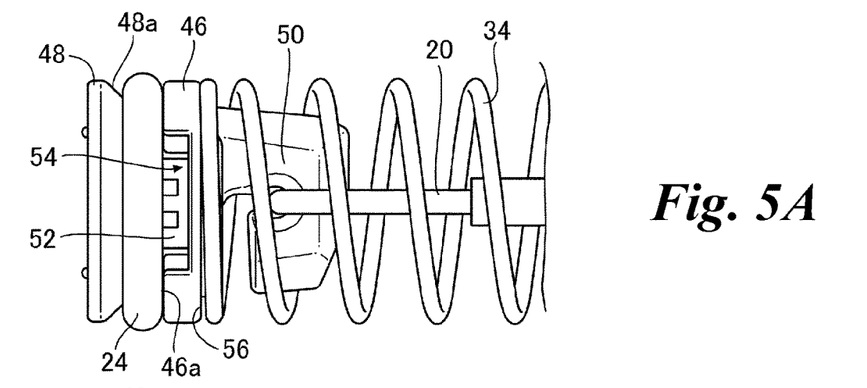
FIGS. 5A to 5C are views for explaining the operation of the damper device in an opened state or in a non-operational state.
Figure 5B:
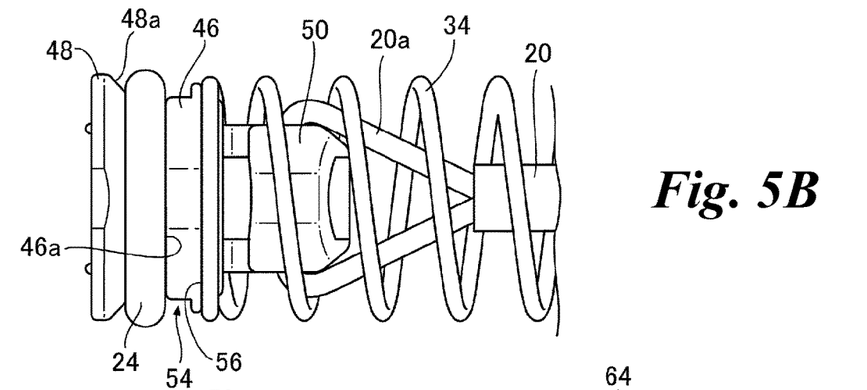
Figure 5C:
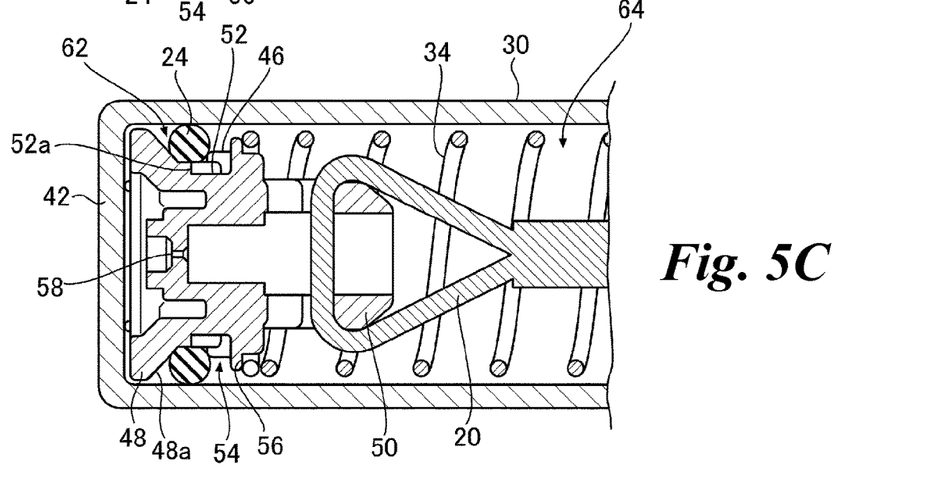
Figure 6A:
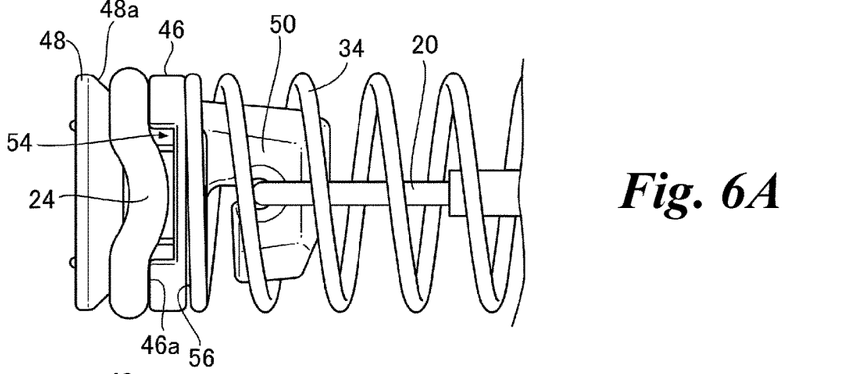
FIGS. 6A to 6C are views for explaining the operation of the damper device in a closed state.
Figure 6B:
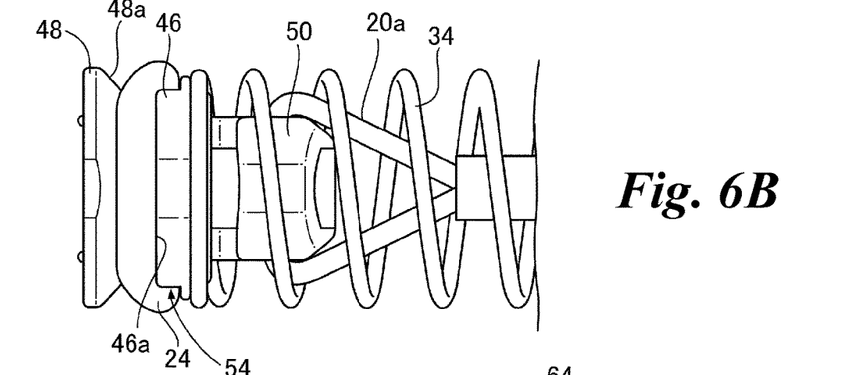
Figure 6C:
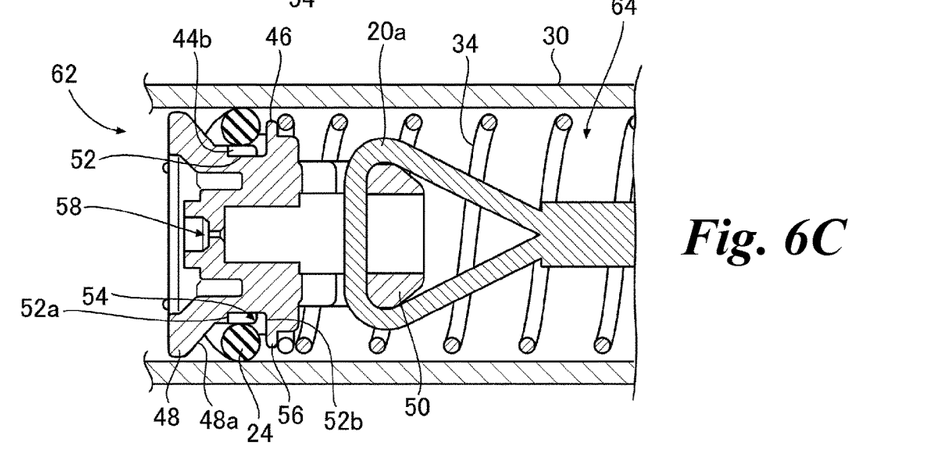

FIGS. 5A to 5C are views for explaining the operation of the damper device 10 in an opened state or in a non-operational state. FIGS. 6A to 6C are views for explaining the operation of the damper device 10 in a closed state. The opened state defines a state where the opening and closing member is opened, which is a state where the piston 22 is pulled by the transmission member 20 and moves forward to the opening portion 40 of the cylinder 30. The closed state defines a state where the opening and closing member is closed, which is a state where the piston 22 moves backward to the bottom portion 42 of the cylinder 30 by the urging force of the urging member 34 or the moving force to close the opening and closing member.

As shown in FIGS. 5A and 5B, the seal ring member 24 is uniform in the circumferential direction and housed in the small-diameter portion 44 during non-operational time. In addition, even in the opened state, the seal ring member 24 is uniform in the circumferential direction though being pressed toward the second stopper surface 48a. As shown in FIG. 5A, the seal ring member 24 does not get in the cutout portions 54. The seal ring member 24 is pushed in the direction opposite to the travelling direction of the piston 22 by the friction with the cylinder 30.

As shown in FIGS. 5A and 5C, the seal ring member 24 rides on a first end portion 52a of each of the groove portions 52 that is disposed closer to the bottom portion 42, and the communication between the first chamber 64 and the second chamber 62 made by the groove portions 52 is closed. The first end portions 52a of the groove portions 52 that are disposed closer to the second chamber 62 are disposed in the middle of the small-diameter portion 44 in the axial direction. The first end portions 52a of the groove portions 52 may be disposed much closer to the bottom portion 42, and thus may not be in a state where the communication is completely blocked by the seal ring member 24 in normal times.

The communication between the first chamber 64 and the second chamber 62 via the groove portions 52 may be closed when the seal ring member 24 is pressed toward the second stopper surface 48a. Alternatively, the communication opening area between the first chamber 64 and the second chamber 62 via the groove portions 52 may be set smaller when the seal ring member 24 is pressed toward the second stopper surface 48a, as compared with when the seal ring member 24 is pressed toward the first stopper surface 46a. Also in this case, as the second chamber 62 becomes under negative pressure in the opened state, large resistance can be exerted to the opening and closing member.

As shown in FIG. 6A in the closed state, the seal ring member 24 is pressed toward the first stopper surface 46a by the friction with the inner circumferential surface of the cylinder 30, and is deformed so as to be partially bent to get in the cutout portions 54. As shown in FIG. 6B, movement and deformation of the seal ring member 24 is restricted by the first stopper surface 46a at the position where the cutout portions 54 is not provided.

As shown in FIG. 6C, a portion of the seal ring member 24 is in the state of riding on the groove portions 52 at midstream in the axial direction, and both ends of the groove portions 52 in the axial direction are not blocked by the seal ring member 24. When the seal ring member 24 is pressed toward the first stopper surface 46a to get in the cutout portions 54, the first chamber 64 and the second chamber 62 of the cylinder 30 are communicated with each other via the groove portions 52. Thus, the communication opening area to the second chamber 62 via the groove portions 52 becomes larger when the seal ring member 24 is pressed toward the first stopper surface 46*a*, as compared with when the seal ring member 24 is pressed toward the second stopper surface 48*a*.

In the closed state, the seal ring member 24 is pressed toward the first stopper surface 46*a*, and is partially deformed to get in the cutout portions 54. Thus, the second end portions 52*b* of the groove portions 52 that are closer to the first chamber 64 in the axial direction are opened to the first chamber 64 while the first end portions 52*a* of the groove portions 52 that are closer to the second chamber 62 are opened to the second chamber 62. The seal ring member 24 rides on the radial deformation suppressing portions 44*b* and 44*c*, and does not fall into the groove portions 52. Thus, the first chamber 64 and the second chamber 62 are communicated with each other via the groove portions 52, and the air in the second chamber 62 is allowed to move into the first chamber 64 to thereby suppress the positive pressure in the second chamber 62 and to smooth the movement of the piston 22. A user can smoothly close the opening and closing member of the glove compartment. When the seal ring member 24 stops sliding with respect to the cylinder 30, the deformed seal ring member 24 moves out of the cutout portions 54, and restores to its former state by restoring force.

As described above, the seal ring member 24 is pressed toward the first stopper surface 46*a* or the second stopper surface 48*a* in accordance with the forward and backward movement of the piston 22. When the real ring member 24 is pressed toward the first stopper surface 46*a*, it is deformed to partially get in the cutout portions 54. A portion of the seal ring member 24 to be moved in and out the cutout portions 54 in accordance with the forward and backward movement of the piston 22 is capable of blocking the communication between the first chamber 64 and the second chamber 62 via the groove portions 52. The communication to the first second chamber 62 via the groove portions 52 may be increased or reduced in accordance with the deformation of the seal ring member 24 in terms of the communication opening area, and it is not necessary to completely block the communication to the first second chamber 62 via the groove portions 52.

Thus, when the seal ring member 24 is deformed to get in the cutout portions 54, an exposed amount of the groove portions 52 over the cutout portions 54 to the second chamber 62 is increased, that is, the communication opening area between the first chamber 64 and the first second chamber 62 is increased. As the communication opening area between the first chamber 64 and the first second chamber 62 are increased, the movement of the air is smoothed, and the damping force produced by the damper device 10 is reduced. The communication opening area via the groove portions 52 is varied in accordance with the forward and backward movement of the piston 22. When the piston 22 moves forward, the seal ring member 24 is not deformed to reduce the exposed amount of the groove portions 52 of the annular outer circumferential portion 44*a*, which allows the damper device 10 to produce a large damping force. On the other hand, when the piston 22 moves backward, the seal ring member 24 is partially deformed to increase the exposed amount of the groove portions 52 to the second chamber 62, which allows the damper device 10 to produce a small damping force. The seal ring member 24 can restore to its former state from the deformed state by restoring force, and thus the damping force can be effectively exerted from the initial motion in next operation.

Since the radial deformation suppressing portion 44*b* and the radial deformation pressing portion 44*c* that are on the same flat plane as the annular outer circumferential portion 44*a* extend in the axial direction, the seal ring member 24 can be prevented from falling into the groove portions 52 when getting in the cutout portions 54 as shown in FIG. 6C. Thus, the seal ring member 24 can smoothly get in and out the cutout portions 54.

For example, when there is a large gap between the seal ring member 24 and the second stopper surface 48*a* in a normal state, the volume of the first chamber 64 and the volume of the second chamber 62 little vary in the initial travelling of the piston 22 until the seal ring member 24 abuts on the second stopper surface 48*a* to start to move, so that resistance produced in the damper device 10 is small. As shown in FIG. 5C, the seal ring member 24 is disposed on the annular outer circumferential portion 44*a* in the state of abutting on both of the first stopper surface 46*a* and the second stopper surface 48*a* in a normal non-operational state. Thus, the relative movement of the seal ring member 24 and the piston 22 can be prevented, which can improve response performance of the damper device 10 in the initial motion.

The seal ring member 24 has a partially crushed shape in cross section when it is sliding with and pressed by the cylinder 30. If there is no space for allowing the seal ring member 24 to escape when it is crushed, the seal ring member 24 could be damaged. When the gap between the first stopper surface 46*a* and the second stopper surface 48*a* is simply made large as a space for allowing the crushed seal ring member 24 to escape, the resistance produced in the damper device 10 is small in the initial travelling of the piston 22 until the seal ring member 24 abuts on the second stopper surface 48*a* to start to move.

In order to solve this problem, the second stopper surface 48*a* is inclined with respect to the first stopper surface 46*a*. This configuration can provide a space for allowing the seal ring member 24 to escape when it is warped in a state where the seal ring member 24 abuts on both of the first stopper surface 46*a* and the second stopper surface 48*a*. When abutting on both of the first stopper surface 46*a* and the second stopper surface 48*a*, the seal ring member 24 is in the state of abutting on almost both of the surfaces; however, the seal ring member 24 may be in the state of abutting on both of the surfaces while having minute gaps provided between both of the surfaces and the seal ring member 24 in order to facilitate the assembling work.

When the warped seal ring member 24 escapes into the space between the cylinder 30 and the second stopper surface 48*a*, a force of friction between the cylinder 30 and the seal ring member 24 increases. Thus, as the piston 22 moves faster, sliding resistance is increased to allow the resistance produced in the damper device 10 to be increased.

The gap between the first stopper surface 46*a* and the second stopper surface 48*a* is set in accordance with the diameter of the seal ring member 24 such that the seal ring member 24 abuts on both of the surfaces. Since the second stopper surface 48*a* is inclined, the smallest gap between the second stopper surface 48*a* and the first stopper surface 46*a* in the axial direction is set to be smaller than the diameter of the seal ring member 24 while the largest gap between the second stopper surface 48*a* and the first stopper surface 46*a* in the axial direction is set to be larger than the diameter of the seal ring member 24. This configuration allows the seal ring member 24 to abut on both of the first stopper surface 46*a* and the second stopper surface 48*a*.

As shown in FIG. 4B, steps 52c between the groove portions 52 and the annular outer circumferential portion 44a are inclined. The steps 52c of the groove portions 52 on both sides in the circumferential direction become shallower in depth as getting closer to the annular outer circumferential portion 44a. This configuration can prevent a lubricant agent such as grease from accumulating in the groove portions 52, which avoids clogging the groove portions 52. The seat portion 56 can suppress excessive partial deformation of the seal ring member 24.

Figure 7A:
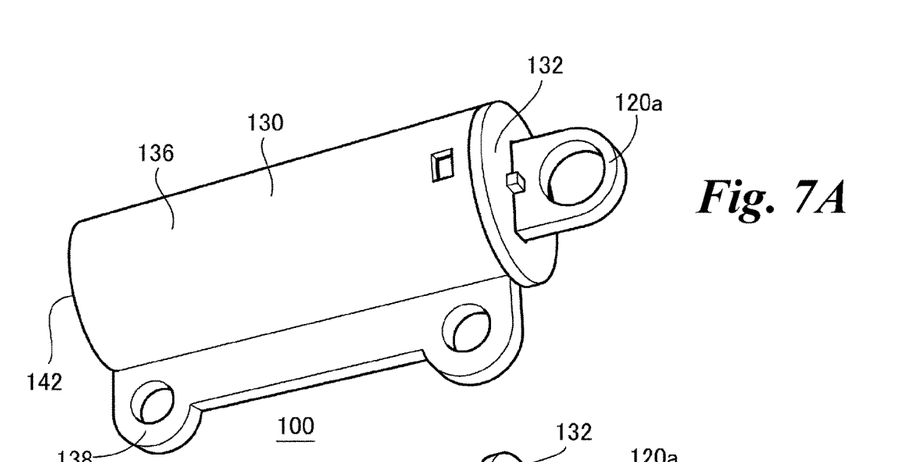
FIGS. 7A to 7C are views for explaining a damper device according to a modification.
Figure 7B:
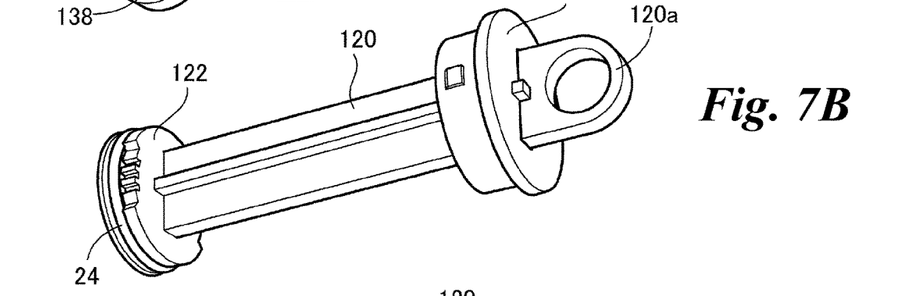
Figure 7C:
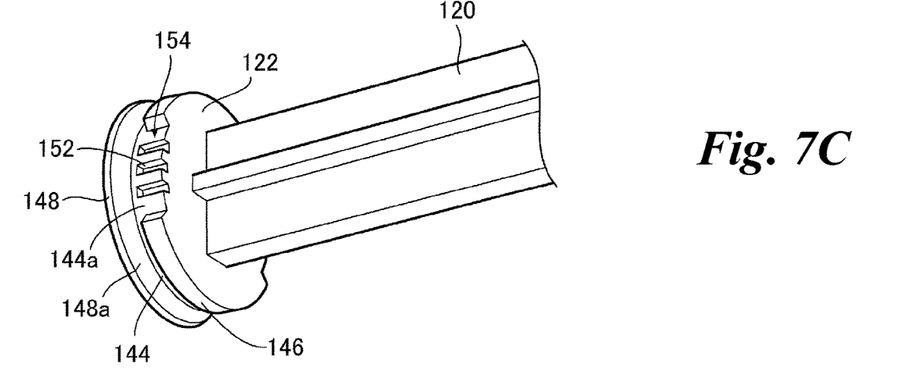

FIGS. 7A to 7C are views for explaining a damper device 100 according to a modification. FIG. 7A is a perspective view of the damper device 100, FIG. 7B is a perspective view of the damper device 100 where a cylinder 130 is removed, and FIG. 7C is an enlarged view of a piston 122 of the damper device 100.

The damper device 100 includes the cylinder 130, a transmission member 120, the piston 122, a lid member 132, and the seal ring member 24. The damper device 100 according to the first modification is significantly different from the damper device 10 shown in FIG. 1 in that the transmission member 120 and the piston 122 are of a monolithic construction, and an urging member is not provided.

The piston 122 has a disc shape, and is connected to the transmission member 120 having a rod shape. A connecting portion 120a is connected to the opening and closing member. The cylinder 130 having a circular cylindrical shape with a bottom includes a cylinder portion 136, a mounting portion 138, and a bottom portion 142. An opening portion of the cylinder 130 is closed with the lid member 132. The seal ring member 24 is disposed on the outer circumference of the piston 122 as shown in FIG. 7B.

The piston 122 includes a small-diameter portion 144, a first large-diameter portion 146, a second large-diameter portion 148, groove portions 152, and cutout portions 154 as shown in FIG. 7C. The seal ring member 24 is disposed on an annular outer circumferential portion 144a that defines the outer circumferential surface of the small-diameter portion 144.

A first stopper surface 146a of the first large-diameter portion 146 protrudes in the radial direction on one end of the annular outer circumferential portion 144a in the axial direction, and restricts movement of the seal ring member 24 in the axial direction. The first stopper surface 146a is orthogonal to the axial direction. A second stopper surface 148a of the second large-diameter portion 148 protrudes in the radial direction on the other end of the annular outer circumferential portion 144a in the axial direction, and restricts movement of the seal ring member 24 in the axial direction. The second stopper surface 148a is inclined to the first stopper surface 146a, and has a tapered shape so as to be radially expanded toward the rear side surface.

The cutout portions 154 are disposed on the first stopper surface 146a. The first large-diameter portion 146 is cut out in the axial direction by the cutout portions 154. The groove portions 152 are formed to reach the surface of the piston 122 from the annular outer circumferential portion 144a.

Also in the damper device 100 according to the first modification, a portion of the seal ring member 24 moves in and out the cutout portions 154 in accordance with the forward and backward movement of the piston 122 to block the communication between the first chamber and the second chamber, both being formed in the cylinder 130, via the groove portions 152. In the first modification, the damper device 100 having improved response performance in the initial motion can be produced at a low cost with a simple configuration.

Figure 8A:
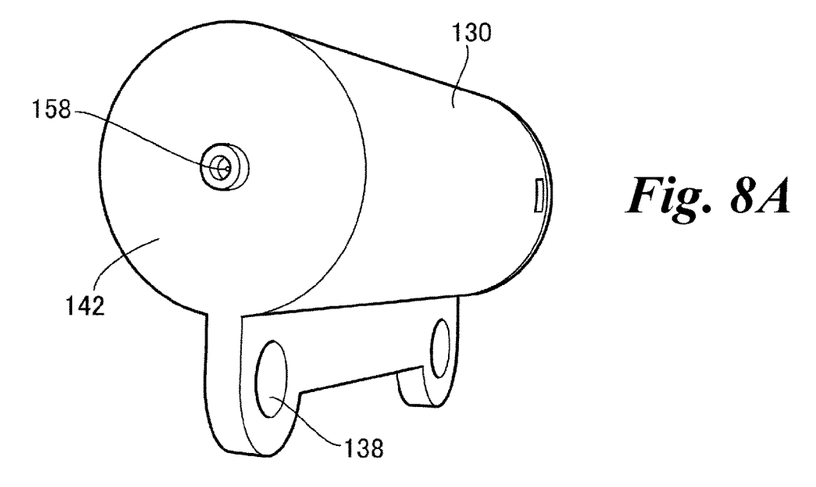
FIG. 8A is a view for explaining an orifice of the damper device according to the modification.
Figure 8B:
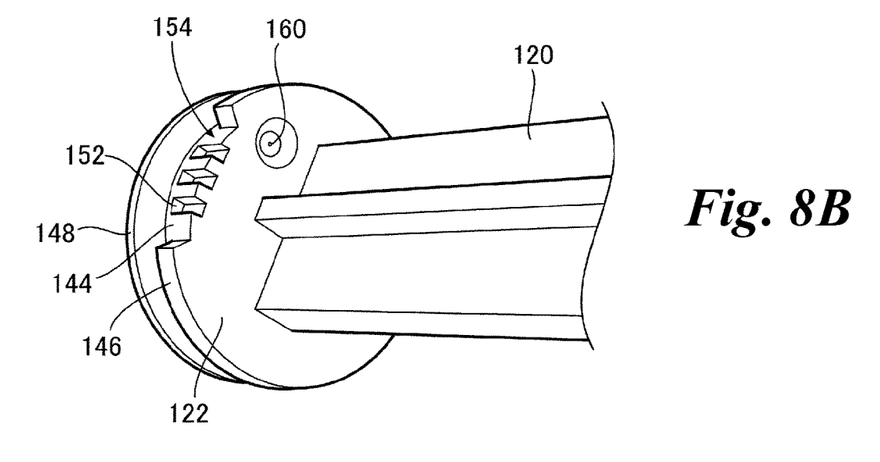
FIG. 8B is an enlarged partial view of the piston showing a modification of the orifice.

FIG. 8A is a view for explaining an orifice 158 of the damper device 100 according to the modification, and FIG. 8B is an enlarged partial view of the piston 122 showing a modification of the orifice.

As shown in FIG. 8A, the orifice 158 is disposed on the bottom portion 142 of the cylinder 130. In FIG. 8B, an orifice 160 is provided to the piston 122. The air is allowed from the outside to the inside and eventually to the first chamber between the piston 122 and the bottom portion 142 little by little via the orifice 158 and the orifice 160.

Figure 9A:
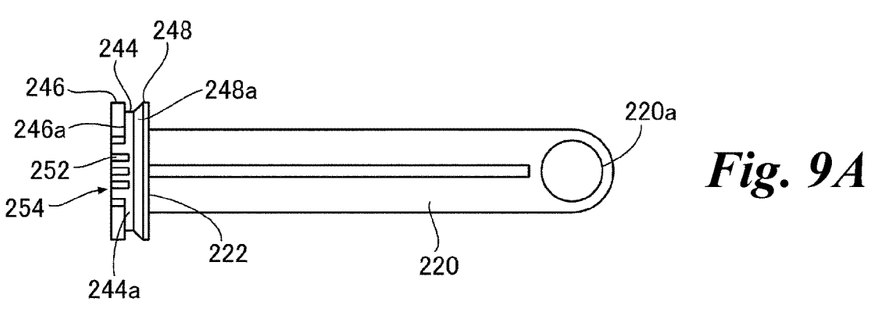
FIGS. 9A and 9B are view for explaining a piston according to a modification.
Figure 9B:
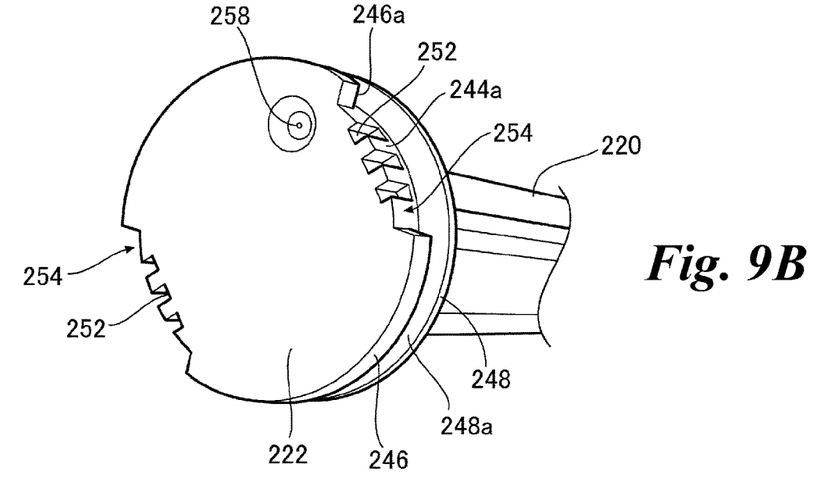

FIGS. 9A and 9B are view for explaining a piston 222 according to a modification. FIG. 9A is a side view of the piston 222 and a transmission member 220, and FIG. 9B is an enlarged perspective view of the piston 222. The transmission member 220 and the piston 222 that are of a monolithic construction according to the modification replaces the piston 122 of the damper device 100.

The transmission member 220 having a rod shape is erected assembled from the piston 222, and a connecting portion 220a is connected to a member to transmit an external force such as the opening and closing member. The piston 222 includes a small-diameter portion 244, a first large-diameter portion 246, a second large-diameter portion 248, groove portions 252, cutout portions 254, and an orifice 258.

A first stopper surface 246a of the first large-diameter portion 246 protrudes in the radial direction on one end of an annular outer circumferential portion 244a in the axial direction, and restricts movement of the seal ring member 24 in the axial direction. A second stopper surface 248a of the second large-diameter portion 248 protrudes in the radial direction on the other end of the annular outer circumferential portion 244a in the axial direction, and restricts movement of the seal ring member 24 in the axial direction.

In comparison with the piston 22 shown in FIG. 4A, the first large-diameter portion 246 and the second large-diameter portion 248 are disposed opposite to each other in the axial direction with respect to the small-diameter portion 244. With this configuration, an action produced in accordance with the forward and backward movement of the piston 222 is made opposite to the action by the piston 22.

When the piston 222 moves forward, the seal ring member 24 is deformed so as to partially get in the cut out portions 254, and the first chamber and the second chamber of the cylinder 130 are communicated with each other via the groove portions 252. When the piston 222 moves backward, the seal ring member 24 restores to its former state to block the communication between the first chamber and the second chamber via the groove portions 252. Thus, the second chamber produces positive pressure to produce resistance larger than the resistance produced at the time of forward movement.

The present invention is not limited to the embodiments described above, and it is also possible to add modifications such as various kinds of design changes to the embodiment based on the knowledge of those skilled in the art. Embodiments to which such modifications are added can also be included within the scope of the present invention.

In the embodiment, the two cutout portions 54 are provided on the first stopper surface 46a 14; however, the present invention is not limited to this embodiment. For example, one cutout portion 54 or three or more cutout portions 54 may be provided on the first large-diameter portion 46.

While the groove portions 52 are provided to the piston 22 as a component to communicate between the first chamber 64 and the second chamber 62 in the embodiment, the present invention is not limited thereto. For example, a communicating hole to communicate between the first chamber 64 and the second chamber 62 may be provided to the piston 22. One opening of the communicating hole is opened to the first chamber 64, whereas the other opening of the communicating hole is provided to the annular outer circumferential portion 44a. In a normal state, while the one opening of the communicating hole is opened, the other opening of the communicating hole is closed by the seal ring member 24 disposed on the outer circumference of the annular outer circumferential portion 44a to be in a closed state. When the seal ring member 24 moves to the cutout portions 54, the other opening of the communicating hole is opened to be brought in a communicated state. The other opening of the communicating hole is disposed on the annular outer circumferential portion 44a at a position from the cutout portions 54 toward the second chamber 62 in the axial direction. Also in this embodiment, a portion of the seal ring member 24 moves in and out the cutout portions 54 in accordance with the forward and backward movement of the piston 22 to allow the communicating hole to be opened or closed. The communicating hole has a similarity with the groove portions 52 at least in that the communicating hole is opened to the outer circumference of the annular outer circumferential portion 44a at the cutout portions 54 closer to the bottom portion 42 in the axial direction, and functions as a communicating portion to communicate between the first chamber 64 and the second chamber 62. In this embodiment, the seal ring member 24 can restore to its former state from the deformed state by restoring force, and thus the damping force can be effectively exerted from the initial motion in next operation.

While the damper device using air has been described in the embodiment, the present invention is not limited thereto; and a damper device using a viscous fluid such as a liquid may be used.

DESCRIPTION OF REFERENCE NUMERALS AND SIGNS

10 Damper device,
20 Transmission member,
20a first connecting portion,
20b second connecting portion,
22 Piston,
24 Seal ring member,
30 cylinder,
32 Lid member,
34 Urging member,
36 Cylinder portion,
38 Mounting portion,
40 Opening portion,
42 Bottom portion,
44 Small-diameter portion,
44a Annular outer circumferential portion,
44b, 44c Radial deformation suppressing portions,
46 first large-diameter portion,
46a first stopper surface,
48 second large-diameter portion,
48a second stopper surface,
50 Connecting portion,
52 Groove portion,
52a first end portion,
52b second end portion,
54 Cutout portion,
56 Seat portion,
58 Orifice,
62 second chamber,
64 first chamber.

INDUSTRIAL APPLICABILITY

The present invention relates to a damper device provided with a seal ring member disposed on the outer circumference of a piston disposed inside a cylinder.

The invention claimed is:
1. A damper device, including:
a cylinder including a bottom portion and an opening portion;
a piston that is movable in the cylinder toward the bottom portion and the opening portion of the cylinder;
a seal ring member that is disposed on an outer circumference of the piston to abut on an inner circumference of the cylinder to thereby divide an inside of the cylinder into a first chamber and a second chamber; and
a transmission member that is connected to the piston, and is capable of transmitting an external force to the piston,
wherein the piston includes:
an annular outer circumferential portion that abuts on an inner circumference of the seal ring member;
a first stopper surface that protrudes in a radial direction of the piston from one side of the annular outer circumferential portion at a side of the first chamber to thereby restrict a movement of the seal ring member toward the first chamber in an axial direction of the piston;
a second stopper surface that protrudes in the radial direction of the piston from another side of the annular outer circumferential portion at a side of the second chamber to thereby restrict a movement of the seal ring member toward the second chamber in the axial direction of the piston;
a cutout portion that is formed on the first stopper surface and has a predetermined width in a circumferential direction of the piston; and
a communicating portion that is formed on the piston to communicate between the first chamber and the second chamber,
wherein the communicating portion includes a groove formed on the annular outer circumferential portion at a position corresponding to the cutout portion,
wherein the seal ring member is configured to be pressed toward one of the first stopper surface and the second stopper surface when the piston is moving in the cylinder,
wherein, when the seal ring member is pressed toward the first stopper surface, the seal ring member is deformed to partially get in the cutout portion,
wherein the piston further includes a seat portion which protrudes in the radial direction of the piston and the seat portion covers the cutout portion formed on the first stopper surface from the side of the first chamber, and
wherein a radial deformation suppressing portion extending in the axial direction of the piston from the second stopper surface toward the first stopper surface is formed in the groove, and a distal end of the radial deformation suppressing portion is separated from the seat portion in the axial direction of the piston.

2. The damper device of claim 1, wherein, when the seal ring member is pressed toward the first stopper surface and the seal ring member partially gets in the cutout portion, a communication between the first chamber and the second chamber of the cylinder via the groove is opened, and wherein, when the seal ring member is pressed toward the second stopper surface, the communication between the first chamber and the second chamber via the groove is closed by the seal ring member.

3. The damper device of claim 1, wherein the seal ring member is disposed on the annular outer circumferential portion in a state of abutting on both of the first stopper surface and the second stopper surface.

4. The damper device of claim 1, wherein the second stopper surface is inclined with respect to the first stopper surface.

5. The damper device of claim 1, wherein the piston further includes a first large-diameter portion, a second large-diameter portion, and a small-diameter portion, wherein the small-diameter portion is disposed between the first large-diameter portion and the second large-diameter portion and is recessed with respect to the first large-diameter portion and the second-large-diameter portion in the radial direction of the piston, wherein each of the first large-diameter portion and the second large-diameter portion is larger in diameter than the small-diameter portion, wherein an outer circumferential surface of the small-diameter portion functions as the annular outer circumferential portion, wherein a surface of the first large-diameter portion at a side of the small-diameter portion functions as the first stopper surface and another surface of the first large-diameter portion at a side opposite to the small-diameter portion functions as the seat portion, and wherein a surface of the second large-diameter portion at a side of the small-diameter portion functions as the second stopper surface.

6. The damper device of claim 1, wherein, when the seal ring member is pressed toward the first stopper surface, the seal ring member protrudes toward the first chamber to penetrate into the cutout portion and the seat portion which covers the cutout portion is configured to suppress an excessive partial deformation of the seal ring member.

7. The damper device of claim 1, wherein, as viewed along the axial direction of the piston, the second stopper surface forms a circle and the first stopper surface does not form a circle due to the cutout portion.

8. The damper device of claim 7, wherein, as viewed along the axial direction of the piston, the seat portion forms a circle such that the seat portion covers the cutout portion from the side of the first chamber.

9. The damper device of claim 1, wherein, when the seal ring member is pressed toward the first stopper surface, portions of the first stopper surface, which are located adjacent to the cutout portion, abut the seal ring.

10. The damper device of claim 1, wherein, when the seal ring member is pressed toward the first stopper surface, portions of the first stopper surface, which confine the cutout portion in the circumferential direction of the piston, abut the seal ring.

11. A damper device, including:
a cylinder including a bottom portion and an opening portion;
a piston that is movable in the cylinder by an external force transmitted by a transmission member; and
a seal ring member that is disposed on an outer circumference of the piston to abut on an inner circumference of the cylinder to divide an inside of the cylinder into a first chamber and a second chamber, wherein the piston includes:
an annular outer circumferential portion that abuts on an inner circumference of the seal ring member;
a first stopper surface that protrudes in a radial direction of the piston from one side of the annular outer circumferential portion at a side of the first chamber to restrict a movement of the seal ring member toward the first chamber in an axial direction of the piston;
a second stopper surface that protrudes in the radial direction of the piston from another side of the annular outer circumferential portion at a side of the second chamber to restrict a movement of the seal ring member toward the second chamber in the axial direction of the piston;
a cutout portion that is formed on the first stopper surface; and
a communicating portion that is formed on the piston to communicate between the first chamber and the second chamber, wherein a portion of the seal ring member gets in and out the cutout portion in accordance with a movement of the piston in the cylinder to open and close the communicating portion, wherein the piston further includes a seat portion which protrudes in the radial direction of the piston and the seat portion covers the cutout portion formed on the first stopper surface from the side of the first chamber, and wherein a radial deformation suppressing portion extending in the axial direction of the piston from the second stopper surface toward the first stopper surface is formed in the groove, and a distal end of the radial deformation suppressing portion is separated from the seat portion in the axial direction of the piston.

12. The damper device of claim 11, wherein, when the seal ring member is pressed toward the first stopper surface and the seal ring member partially gets in the cutout portion, a communication between the first chamber and the second chamber of the cylinder via the communicating portion is opened, and wherein, when the seal ring member is pressed toward the second stopper surface, the communication between the first chamber and the second chamber via the communicating portion is closed by the seal ring member.

13. The damper device of claim 11, wherein the seal ring member is disposed on the annular outer circumferential portion in a state of abutting on both of the first stopper surface and the second stopper surface.

14. The damper device of claim 11, wherein the second stopper surface is inclined with respect to the first stopper surface.

15. The damper device of claim 11, wherein the piston includes a first large-diameter portion, a second large-diameter portion, and a small-diameter portion, wherein the small-diameter portion is disposed between the first large-diameter portion and the second large-diameter portion and is recessed with respect to the first large-diameter portion and the second-large-diameter portion in the radial direction of the piston, wherein each of the first large-diameter portion and the second large-diameter portion is larger in diameter than the small-diameter portion, wherein an outer circumferential surface of the small-diameter portion functions as the annular outer circumferential portion, wherein one surface of the first large-diameter portion at a side of the small-diameter portion functions as the first stopper surface and another surface of the first large-diameter portion at a side opposite to the small-diameter portion functions as the seat portion, and wherein one surface of the second large-diameter portion at a side of the small-diameter portion functions as the second stopper surface.

16. The damper device of claim 11, wherein, when the seal ring member is pressed toward the first stopper surface, the seal ring member protrudes toward the first chamber to penetrate into the cutout portion and the seat portion which covers the cutout portion is configured to suppress an excessive partial deformation of the seal ring member.

17. The damper device of claim 11, wherein, as viewed along the axial direction of the piston, the second stopper surface forms a circle and the first stopper surface does not form a circle due to the cutout portion.

18. The damper device of claim 17, wherein, as viewed along the axial direction of the piston, the seat portion forms a circle such that the seat portion covers the cutout portion from the side of the first chamber.

19. The damper device of claim 11, wherein, when the seal ring member is pressed toward the first stopper surface, portions of the first stopper surface, which are located adjacent to the cutout portion, abut the seal ring.

20. The damper device of claim 11, wherein, when the seal ring member is pressed toward the first stopper surface, portions of the first stopper surface, which confine the cutout portion in the circumferential direction of the piston, abut the seal ring.

* * * * *